No. 746,526. PATENTED DEC. 8, 1903.
JOHN KOELLING, HENRY KOELLING & HERMANN KOELLING.
CORN HUSKING MACHINE.
APPLICATION FILED DEC. 23, 1901.
NO MODEL. 2 SHEETS—SHEET 1.
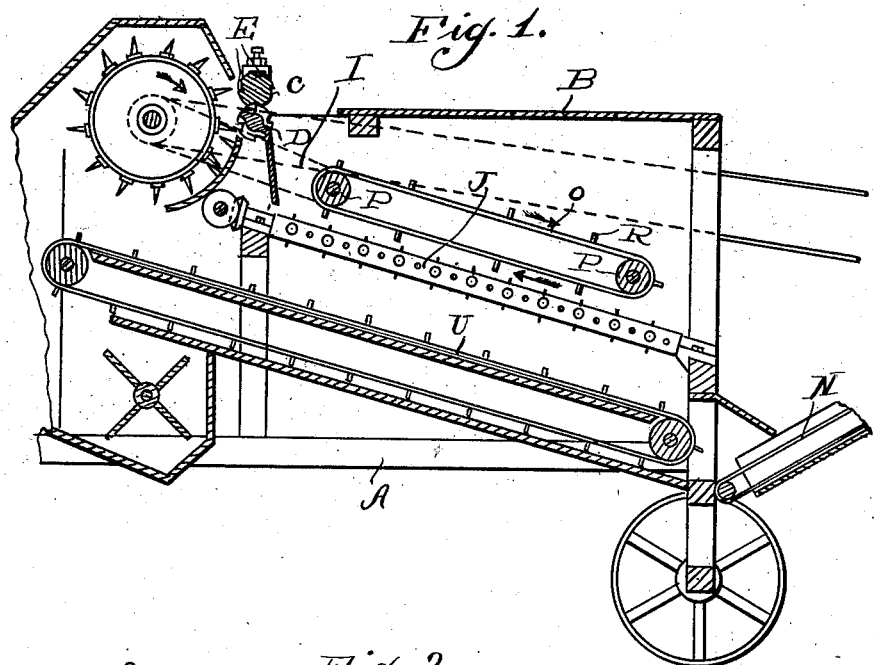
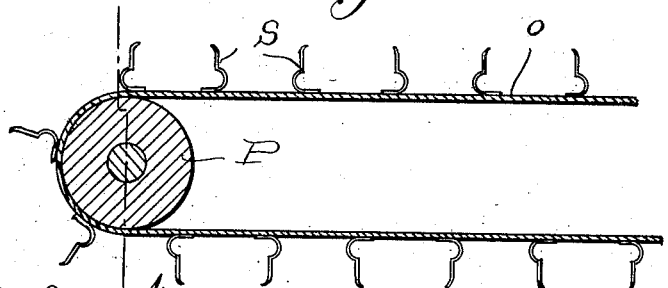
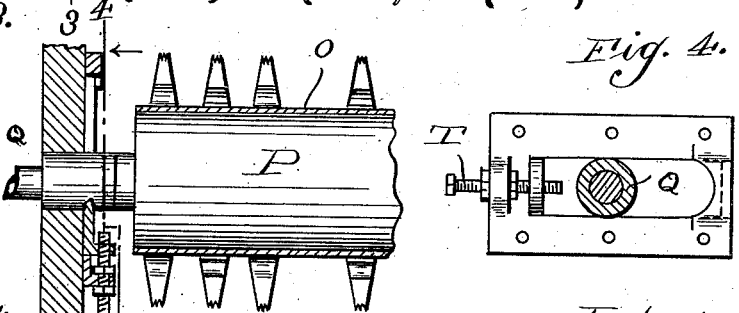
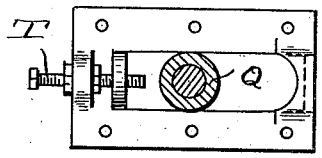
Witnesses:
E. F. Wilson
John Smorhook
Inventors:
John Koelling
Henry Koelling
Hermann Koelling
By Rudolph Wm. Lotz
Attorney.

No. 746,526. PATENTED DEC. 8, 1903.
JOHN KOELLING, HENRY KOELLING & HERMANN KOELLING.
CORN HUSKING MACHINE.
APPLICATION FILED DEC. 23, 1901.
NO MODEL. 2 SHEETS—SHEET 2.
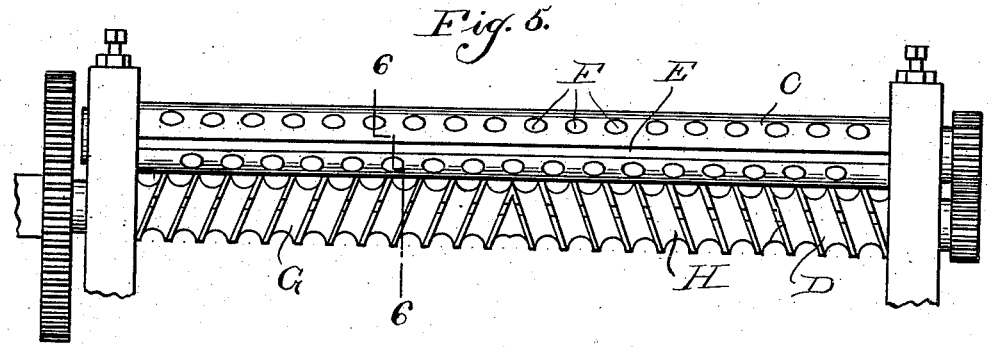
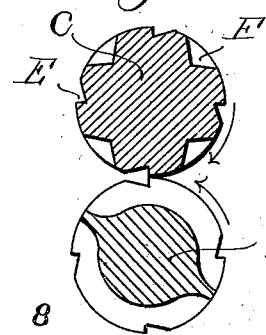
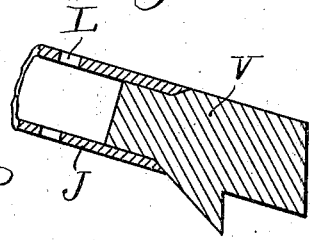
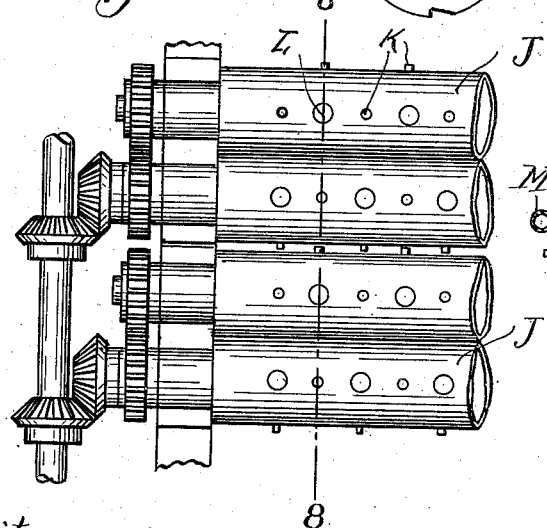
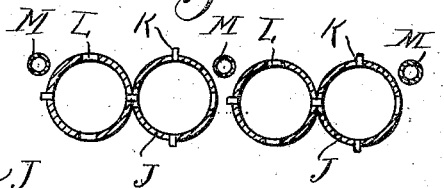

No. 746,526.

Patented December 8, 1903.

UNITED STATES PATENT OFFICE.

JOHN KOELLING, HENRY KOELLING, AND HERMANN KOELLING, OF ARLINGTON HEIGHTS, ILLINOIS.

CORN-HUSKING MACHINE.

SPECIFICATION forming part of Letters Patent No. 746,526, dated December 8, 1903.

Application filed December 23, 1901. Serial No. 87,006. (No model.)

*To all whom it may concern:*

Be it known that we, JOHN KOELLING, HENRY KOELLING, and HERMANN KOELLING, citizens of the United States, residing at Arlington Heights, in the county of Cook and State of Illinois, have invented certain new and useful Improvements in Corn-Husking Machines; and we do hereby declare the following to be a full, clear, and exact description of the invention, such as will enable others skilled in the art to which it appertains to make and use the same.

Our invention relates to a novel construction in a corn-husking machine, the object being to provide means whereby the husking of the corn will be completely accomplished irrespective of the condition of the corn at such time; and it consists in the features of construction and combinations of parts hereinafter fully described and claimed.

In the accompanying drawings, illustrating our invention, Figure 1 is a fragmentary vertical longitudinal section of a corn-husking machine constructed in accordance with our invention. Fig. 2 is a detail fragmentary longitudinal section, on an enlarged scale, of a belt forming part of our machine. Fig. 3 is a detail fragmentary section on the line 3 3 of Fig. 2. Fig. 4 is a detail section on the line 4 4 of Fig. 3. Fig. 5 is a detail view in elevation, on an enlarged scale, of the rollers for separating the ears of corn from the stalk. Fig. 6 is a section, on an enlarged scale, on the line 6 6 of Fig. 5. Fig. 7 is a fragmentary top plan view of the husking-rollers. Fig. 8 is a section on the line 8 8 of Fig. 7. Fig. 9 is a detail fragmentary longitudinal section of the lower end of one of the husking-rolls, showing the bearing on which same is journaled.

In husking corn the condition of the corn determines the manner of operating on same. If same is moist, it is more easily husked than if dry, and hence the period of subjection of the corn to the action of the husking devices must be increased or diminished in accordance with such conditions. A large part of the husking is accomplished by the rollers which separate the ears from the stalk and which are commonly termed "snapping-rolls."

Hence our present invention has for its chief object to provide means for retarding the movement of the corn from one end to the other of the husking-rolls when such corn is dry and accelerate such movement when the corn is moist, thereby assuring complete husking of the corn without excessive shelling of same.

Another object of our invention is to so construct the snapping-rolls as to prevent choking and at the same time spread the stalks and in snapping to cause same to bite the stems of the ears as near the latter as possible, so as also to catch the ends of the husks, thereby causing same to tear off the husks with the stem.

To these and other ends our machine consists of a frame A, provided with a feed-table B, upon which the stalks are laid and are fed to the snapping-rolls C and D, journaled in bearings on the upper portion of said frame A. The said roller C consists of a cylindrical drum provided with a plurality of longitudinal V-shaped grooves E and between said grooves with series of recesses F of conical shape. The said roller D is provided with right and left spiral grooves G and H, respectively, both extending from the middle to opposite ends of the roller. The ribs bordering said grooves are provided with V-shaped notches corresponding in number and relative location with the grooves E of roller C and are adapted to coact with the latter to secure a firm grip on the cornstalk and force same through the machine. The said spiral grooves also serve to spread the cornstalks as the latter pass between said rollers, thereby preventing choking. The said grooves and recesses in roller C serve to roughen the surface thereof and also to provide sharp edges, which grasp or bite the stem of the ear in such a manner as to pull down the husks at the same time that the ear is snapped off, thereby serving largely the double purpose of snapping and husking. The said rollers C and D are of equal diameter and are geared together to revolve at equal speed. The ears snapped off the stalk by said rollers C and D fall through the opening I upon the husking-rollers J, the latter being inclined and journaled in bearings on crosspieces of the frame A. The said rollers J are arranged in pairs and consist each of a hollow cylinder provided longitudinally with a series of pins K, alternated with openings L of larger diameter than said pins, said pins of one roller being adapted to enter the openings in the other roller. Adjacent rollers of adjacent pairs are separated by a space sufficient to give clearance to the projecting pins, and the ears are prevented from dropping through said spaces by pipes M, interposed above such spaces. As the ears fall upon said rollers, they are obviously agitated and the husks loosened by the pins and then by being pinched between the rollers are torn off the ear. Owing to the inclination of said rollers the said ears gradually move toward the depressed ends of same, being fully husked by that time, and drop thence upon a conveyer-belt N, which delivers them to any desired receptacle. The said rollers J will obviously shell the ears to some extent, and hence it is desirable that they be subjected to the action of said rollers only long enough to be husked and should then be delivered therefrom. As the time required to effect the husking varies according to the size and condition of the ears, we have found it absolutely necessary to provide some means for controlling the speed at which the ears travel over said rollers, and to this end we provide a belt O, trained over rollers P, above said husking-rolls J, the said rollers P being journaled in sliding bearings Q, whereby the entire belt can be raised and lowered as desired. The said belt O carries transverse slats R or in place thereof preferably spring-tongues S, which as said belt moves engage the ears of corn and either accelerate or retard their movement longitudinally over the husking-rollers accordingly as said belt travels in one direction or the other, it having been our experience that reversing the belt has the desired effect of retarding the downward movement of the ears.

We prefer to employ the spring-tongue S in place of the slats R, as said tongues are provided with saw-teeth at their free ends, which when they engage the ear serve also to loosen and tear the husks, thereby enabling the pins of the rollers J to more readily grasp the same. Said springs are also preferable for the reason that they will give when engaging an ear and spring over same. The said tongues S consist of tapered plates bent to semicircular form at their larger ends, at which they are secured to the belt O, while their smaller ends project straight out radially relative to the semicircular portions, while their toothed ends are slightly bent over, the said tongues being so set that the said bent toothed ends thereof extend alternately in opposite directions, so that when the belt moves in either direction said teeth of half said tongues will effect a tearing action on the husks. The sliding bearings Q are raised and lowered by means of the screws T in an obvious manner, and by means thereof said belt O may be adjusted in height so that the slats or tongues thereon will just engage the uppermost portions of the ears, the latter being sometimes very large and sometimes very small.

Suitable reversing-gear may obviously be employed to reverse the movement of the belt O; but we prefer for reasons of economy to simply change the belt driving one of the rollers P, particularly as the need of reversing such belt does not occur with sufficient frequence to render reversing-gear desirable.

Below said husking-rolls J is a belt U, which receives and transports the husks removed by said rolls and also all the shelled corn to suitable separating devices, which are not shown, as they do not form a part of our present invention.

In order to permit the ears of corn to freely leave the husking-rolls J at their lower ends, we leave the same open and countersink such lower ends and fit same over step-bearings V, which enter said lower ends of the rollers. In this manner the use of trunnions on the lower ends of the rollers is avoided, and at the same time no part of the bearing V projects into the path of the ears. This is obviously advantageous and at the same time inexpensive.

We claim as our invention—

In a corn-husking machine, the combination with a roller provided with longitudinal grooves and with series of recesses arranged between said grooves, of a roller provided with right and left spiral grooves which extend inward from its opposite ends to an approximately central point, the ridges bordering said grooves being formed with notches, and gearing between said rollers, said rollers being adapted to receive the cornstalks between the same and spread and separate the ears therefrom, said grooves and recesses being adapted to grasp the husks at the base of the ear to remove same with the stem, substantially as described.

In testimony whereof we affix our signatures in presence of two witnesses.

JOHN KOELLING.
HENRY KOELLING.
HERMANN KOELLING.

Witnesses:
E. F. WILSON,
JOHN SNOWHOOK.